United States Patent
Sugiyama et al.

(10) Patent No.: US 10,872,609 B2
(45) Date of Patent: Dec. 22, 2020

(54) METHOD, APPARATUS, AND PROGRAM OF DIALOG PRESENTATION STEPS FOR AGENTS

(71) Applicants: NIPPON TELEGRAPH AND TELEPHONE CORPORATION, Chiyoda-ku (JP); OSAKA UNIVERSITY, Suita (JP)

(72) Inventors: Hiroaki Sugiyama, Soraku-gun (JP); Toyomi Meguro, Soraku-gun (JP); Junji Yamato, Soraku-gun (JP); Yuichiro Yoshikawa, Suita (JP); Hiroshi Ishiguro, Suita (JP)

(73) Assignees: NIPPON TELEGRAPH AND TELEPHONE CORPORATION, Chiyoda-ku (JP); OSAKA UNIVERSITY, Suita (JP)

( * ) Notice: Subject to any disclaimer, the term of this patent is extended or adjusted under 35 U.S.C. 154(b) by 128 days.

(21) Appl. No.: 16/301,611

(22) PCT Filed: May 19, 2017

(86) PCT No.: PCT/JP2017/018795
§ 371 (c)(1),
(2) Date: Nov. 14, 2018

(87) PCT Pub. No.: WO2017/200080
PCT Pub. Date: Nov. 23, 2017

(65) Prior Publication Data
US 2019/0189123 A1    Jun. 20, 2019

(30) Foreign Application Priority Data
May 20, 2016    (JP) .................................. 2016-101227

(51) Int. Cl.
*G10L 15/22* (2006.01)
*G10L 15/183* (2013.01)
(Continued)

(52) U.S. Cl.
CPC .............. *G10L 15/22* (2013.01); *G10L 13/00* (2013.01); *G10L 15/32* (2013.01); *G10L 15/1815* (2013.01); *G10L 2015/225* (2013.01)

(58) Field of Classification Search
CPC ... G10L 15/1815; G10L 15/183; G10L 15/22; G10L 2015/225
(Continued)

(56) References Cited

U.S. PATENT DOCUMENTS 7,580,908 B1 * 8/2009 Horvitz ............... G10L 15/1822
706/45
9,779,723 B2 * 10/2017 Panainte ................. G10L 15/28
(Continued)

FOREIGN PATENT DOCUMENTS

JP    2014-222402 A    11/2014

OTHER PUBLICATIONS

International Search Report dated Aug. 1, 2017 in PCT/JP2017/018795, 3 pages.
(Continued)

*Primary Examiner* — Martin Lerner
(74) *Attorney, Agent, or Firm* — Oblon, McClelland, Maier & Neustadt, L.L.P.

(57) ABSTRACT

A dialog method carried out by a dialog system includes an agent that performs a dialog with a user. The dialog method carried out by the dialog system includes a speech receiving step in which the dialog system receives input of a user speech which is a speech of the user, a first presentation step in which when the dialog system cannot obtain any recognition result of a desired level corresponding to the user
(Continued)

speech, the dialog system presents a speech which does not include any content words as a first agent speech which is a speech of the agent uttered immediately after the user speech and a second speech step in which the dialog system presents a speech generated or selected not based on the user speech as a second agent speech which is a speech of an agent uttered after uttering the first agent speech.

10 Claims, 5 Drawing Sheets

(51) Int. Cl.
*G10L 15/32* (2013.01)
*G10L 13/00* (2006.01)
*G10L 15/18* (2013.01)

(58) Field of Classification Search
USPC ............................... 704/235, 236, 270, 275
See application file for complete search history.

(56) References Cited

U.S. PATENT DOCUMENTS

| | | | |
|---|---|---|---|
| 10,587,708 B2* | 3/2020 | Laird-McConnell | H04L 51/02 |
| 2002/0049805 A1* | 4/2002 | Yamada | G06F 3/167 709/202 |
| 2006/0047362 A1* | 3/2006 | Aoyama | G10L 15/22 700/245 |
| 2006/0293886 A1* | 12/2006 | Odell | G10L 15/08 704/231 |
| 2007/0233497 A1* | 10/2007 | Paek | G10L 15/22 704/270 |
| 2007/0239459 A1* | 10/2007 | Horvitz | G06F 3/16 704/275 |
| 2010/0124325 A1* | 5/2010 | Weng | G10L 15/22 704/251 |
| 2011/0255673 A1* | 10/2011 | Baker | H04M 1/642 379/88.23 |
| 2012/0046951 A1* | 2/2012 | Michelini | G10L 15/22 704/270.1 |
| 2012/0265528 A1* | 10/2012 | Gruber | G10L 15/183 704/235 |
| 2014/0025380 A1* | 1/2014 | Koch | G10L 15/1822 704/257 |
| 2014/0146962 A1* | 5/2014 | Busayapongchai | H04M 3/4933 379/265.12 |
| 2015/0039316 A1* | 2/2015 | Tzirkel-Hancock | G10L 15/22 704/275 |
| 2016/0035353 A1* | 2/2016 | Chen | G10L 15/1815 704/235 |
| 2016/0155445 A1* | 6/2016 | Selfridge | G10L 15/1822 704/249 |
| 2016/0283465 A1* | 9/2016 | Patris | G10L 15/22 |
| 2019/0206406 A1* | 7/2019 | Sugiyama | G10L 15/22 |
| 2019/0294638 A1* | 9/2019 | Sugiyama | G10L 15/22 |
| 2019/0295546 A1* | 9/2019 | Sugiyama | G10L 15/22 |
| 2019/0304451 A1* | 10/2019 | Sugiyama | G10L 15/22 |
| 2020/0013403 A1* | 1/2020 | Sugiyama | G10L 15/22 |
| 2020/0027455 A1* | 1/2020 | Sugiyama | G10L 15/22 |
| 2020/0034434 A1* | 1/2020 | Sugiyama | G10L 15/22 |

OTHER PUBLICATIONS

Shitaoka, K., et al., "Active Listening System for a Conversation Robot", Dai 58 Kai Reports of the Meeting of Special Internet Group on Spoken Language Understanding and Dialogue Processing, Feb. 5, 2010, pp. 61-66 with cover page (with English abstract and English translation).

Weizenbaum, J., "ELIZA—A Computer Program for the Study of Natural Language Communication Between Man and Machine", Computational Linguistics, Communications of the ACM, vol. 9 No. 1, Jan. 1966, pp. 36-45.

Higashinaka, R., et al., "Evaulation Coherence in Open Domain Conversational Systems", Proceedings of Interspeech 2014, Sep. 14-18, 2014, pp. 130-134.

Sugiyama, H., "Chat-Oriented Dialogue Breakdown Detection based on Combination of Various Data", Sixth dialogue system symposium (SIG-SLUD), The Japanese Society for Artificial Intelligence, pp. 51-56 (with English abstract and English translation).

Sugiyama, H., et al., "Leveraging Dependency Relations and Sentence Examples in Web-scale Corpus for Open-domain Utterance Generation", Transactions of the Japanese Society for Artificial Intelligence, 2015, vol. 30 No. 1, pp. 183-194, (with partial English translation).

Arimoto, et al., "Impression Evaluation of Dialogue without Voice Recognition by Plural Robots", Conference of the Robots Society of Japan, 2016, 4 pages (with partial English translation).

Office Action dated Jan. 28, 2020 in Japanese Patent Application No. 2018-518379 (with English translation) 9 pages.

\* cited by examiner

METHOD, APPARATUS, AND PROGRAM OF DIALOG PRESENTATION STEPS FOR AGENTS

TECHNICAL FIELD

The present invention relates to a technique for a computer to perform a dialog with a human using a natural language, which is applicable to a robot or the like communicating with the human.

BACKGROUND ART

In recent years, research and development on robots communicating with humans has been progressing and put to practical use at various scenes. For example, at the site of communication therapy, there is a usage pattern in which a robot serves as a companion to talk with a person feeling loneliness. More specifically, a robot plays a role of a listener to a resident at elder care facilities, can thereby heal the loneliness of the resident, and also can show the resident having dialogue with the robot to make chances to start dialogue between the resident and people around the resident such as his/her family and careworkers. In addition, at the site of a communication training, there is a usage pattern in which a robot becomes a training partner. More specifically, the robot becomes a training partner for foreign language learners at a foreign language learning facility, thus helping the foreign language learners to efficiently proceed with foreign language learning. Furthermore, in an application as an information presentation system, robots perform a dialog with each other and have their dialog heard by people as a basis, sometimes talk to people, cause the people to join in dialogue without making the people bored, and can thereby present information in a form easily acceptable to the people. More specifically, when people feel bored at a meeting place, a bus stop, a platform at a station or the like in a town or when people can afford to participate in a dialog at home or a classroom or the like, it is possible to expect efficient presentation of information such as news, merchandise introduction, introduction of a store of information or knowledge, education (for example, nursery and education of children, education in the liberal arts for adult people, moral enlightenment). Furthermore, in an application as an information collection system, there is a usage pattern in which a robot collects information while talking to people. Since it is possible to maintain a feeling of dialog through communication with the robot, the system can gather information without giving people any feeling of oppression that they are being listened to by a third party. More specifically, the system is expected to be applicable to a personal information survey, a market survey, a merchandise evaluation, a taste investigation for recommended commodity or the like. Thus, a variety of applications are expected from communication between humans and robots, and an implementation of a robot that interacts with users more naturally is expected. With the wide spread of smartphones, chat services such as LINE (registered trademark) are also realized whereby a plurality of users chat with each other substantially in real time, enjoying dialogue among users. By applying a technique of dialogue between users and robots to this chat service, it is possible to implement a chat service whereby robots can have dialogue with users more naturally even in the absence of any user who becomes a chat partner. In the present specification, hardware which becomes a dialog partner of a user such as robots used in these services or chat partner or computer software for causing a computer to function as hardware to become the user's dialog partner are generically called an "agent." Since the agent is intended to become the user's dialog partner, the agent may be personified such as a robot or chat partner, personalized or may possess characters or individuality.

The key to the implementation of these services is a technique that enables the agent implemented by hardware or computer software to perform a dialog with humans naturally.

As a prior art that generates a speech uttered by an agent in response to a human speech, rule-based arts are being researched and put to practical use (see non-patent literature 1).

PRIOR ART LITERATURE

Non-Patent Literature

Non-patent literature 1: Weizenbaum, Joseph (January 1966), "ELIZA—A Computer Program For the Study of Natural Language Communication Between Man And Machine", Communications of the ACM 9 (1), 1966, pp. 36-45.

SUMMARY OF THE INVENTION

Problems to be Solved by the Invention

Conventional dialog systems recognize a voice uttered by a user, utter a speech based on a voice recognition result, and thereby perform a dialog with the user. With the conventional dialog systems, when a recognition result of a desired level cannot be obtained for the voice uttered by the user, for example, when the voice uttered by the user cannot be recognized or a voice recognition error is detected in the voice uttered by the user, the dialog system asks the user to repeat the speech in the form of repeating the question or responds to the user's speech with an ambiguous reply or nodding. The current voice recognition accuracy of the voice recognition technique included in the voice dialog system does not reach the level of human voice recognition yet. Therefore, when the voice dialog system asks for repetition of a speech, more requests for repetition of the speech than those in a dialog between humans are generated. Requests for repetition of the speech may inhibit natural progress of a dialog. Many requests for repetition of the speech may produce adverse effects such as preventing a dialog from becoming active or making continuation of the dialog itself difficult. Even when the speech is responded with an ambiguous reply or nodding, continuation of a speech with little substance by the voice dialog system may produce adverse effects such as making it difficult for the user to think of the next speech and spoiling the user's desire for the dialog.

It is an object of the present invention to provide a dialog method, a dialog apparatus and a program thereof that will eliminate the need for the user to think of the next speech even when a recognition result of a desired level in response to a speech uttered by the user is not obtained, and enable the dialog itself to be easily continued without the need for repeating the speech.

Means to Solve the Problem

In order to solve the above-described problems, a dialog method carried out by a dialog system according to an aspect of the present invention comprises an agent that performs a dialog with a user. The dialog method carried out by the dialog system comprises a speech receiving step in which the dialog system receives input of a user speech which is a speech of the user, a first presentation step in which when the dialog system cannot obtain any recognition result of a desired level corresponding to the user speech, the dialog system presents a speech which does not include any content words as a first agent speech which is a speech of the agent uttered immediately after the user speech, and a second speech step in which the dialog system presents a speech generated or selected not based on the user speech as a second agent speech which is a speech of an agent uttered after uttering the first agent speech.

In order to solve the above-described problems, according to another aspect of the present invention, a dialog apparatus obtains a speech uttered by an agent that performs a dialog with a user. The dialog apparatus comprises a recognition part that recognizes a user speech which is a speech of the user and obtains a recognition result, a recognition result decision part that decides whether or not the recognition result of the user speech is a recognition result of a desired level, and a speech determination part that obtains, when the recognition result of the desired level corresponding to the user speech is not obtained, a speech which does not include any content words as a first agent speech which is a speech of the agent uttered immediately after the user speech, and generates or selects a speech not based on the user speech as a second agent speech which is a speech of an agent uttered after uttering the first agent speech.

Effects of the Invention

The present invention provides an effect that even when a recognition result of a desired level for a speech uttered by the user cannot be obtained, it is possible to easily continue a dialog itself without the need for the user to think of the next speech and without the need for repeating the speech.

DETAILED DESCRIPTION OF THE EMBODIMENTS

Figure 1:
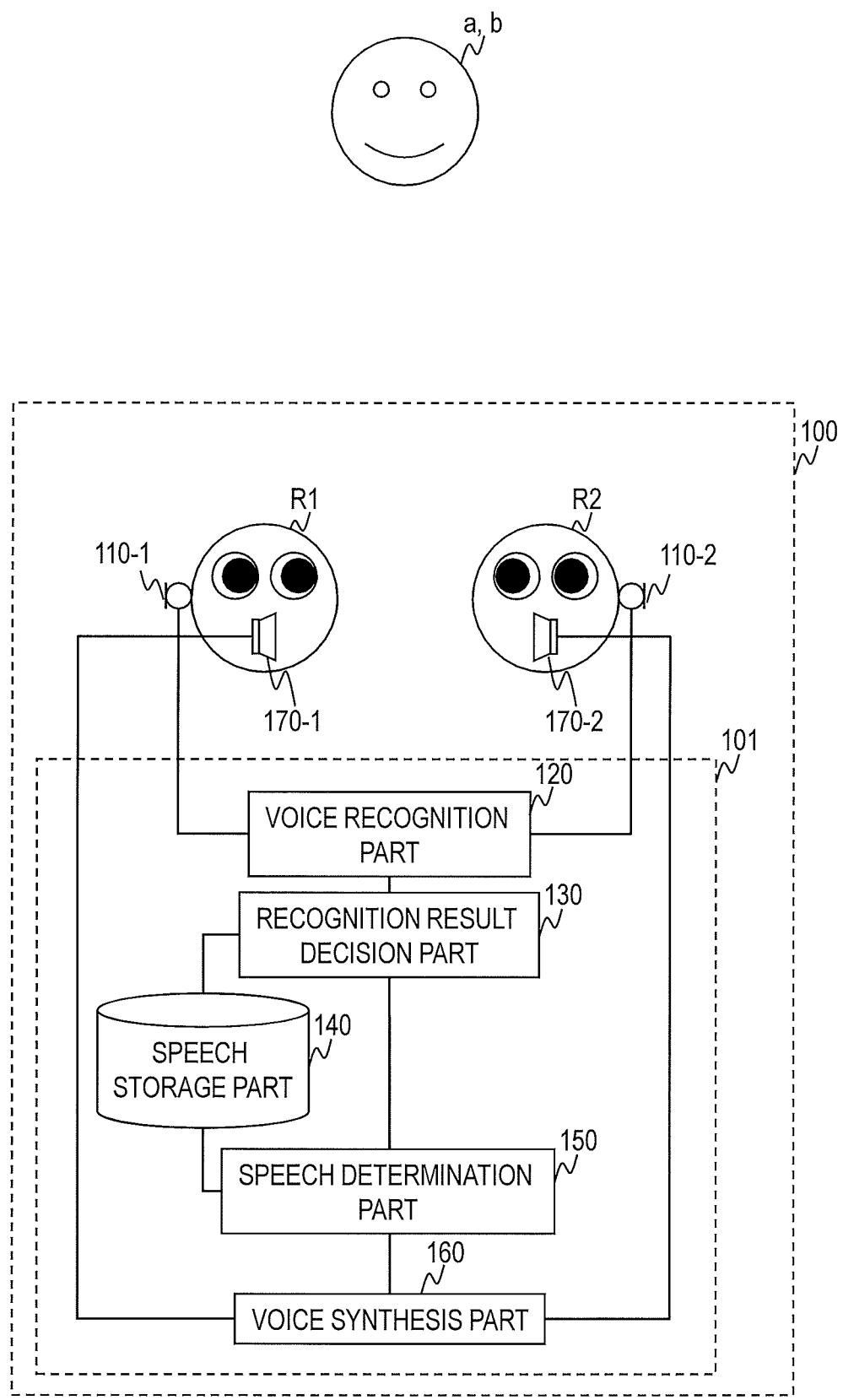
FIG. 1 is a functional block diagram of a dialog system according to a first embodiment and a second embodiment.

Hereinafter, embodiments of the present invention will be described. Note that among the accompanying drawings used in the following description, components having identical functions and steps in which identical processes are executed are assigned identical reference numerals and overlapping description will be omitted.

First Embodiment

Figure 2:
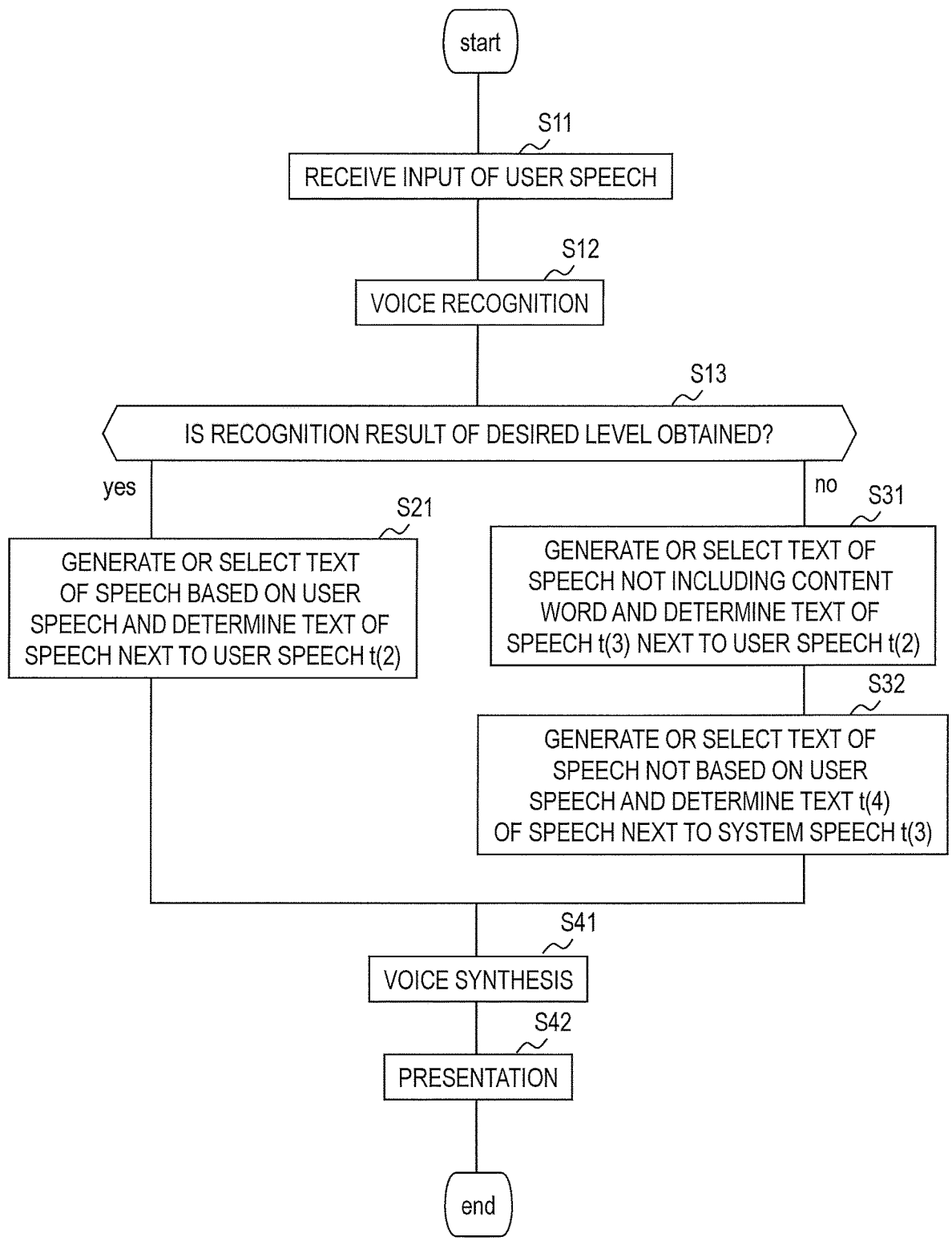
FIG. 2 is a diagram illustrating an example of a processing flow of the dialog system according to the first embodiment and the second embodiment.

FIG. 1 is a functional block diagram of a dialog system 100 according to a first embodiment, and FIG. 2 is a processing flow of the dialog system 100 according to the first embodiment.

The dialog system 100 includes robots R1 and R2, and a dialog apparatus 101. The robot R1 includes an input part 110-1 and a presentation part 170-1, and the robot R2 includes an input part 110-2 and a presentation part 170-2. The input parts 110-1 and 110-2 are intended to collect acoustic signals emitted from around the robots and are, for example, microphones. The presentation parts 170-1 and 170-2 are intended to emit acoustic signals around the robots R1 and R2, and are, for example, speakers. The dialog apparatus 101 includes a voice recognition part 120, a recognition result decision part 130, a speech storage part 140, a speech determination part 150 and a voice synthesis part 160.

The dialog system 100 is intended for a human who is a user to perform a dialog with the two robots R1 and R2, and for the robots R1 and R2 to utter speech voices (synthesized voice data) generated by the dialog apparatus 101 in response to a speech of the human who is the user. Hereinafter, operation of each part of the dialog system 100 will be described.

[Robots R1 and R2]

The robots R1 and R2 are intended to perform a dialog with the user, arranged near the user and utter speeches generated by the dialog apparatus 101.

[Input Parts 110-1 and 110-2]

The input parts 110-1 and 110-2 collect a speech voice uttered by the user (S11) and output the collected voice data to the voice recognition part 120.

Since the input part only has to be able to collect speech voices uttered by the user, any one of the input parts 110-1 or 110-2 may need not be provided. A configuration may also be adopted in which microphones set at places different from the robots R1 and R2, for example, in the vicinity of the user may be used as the input parts or none of the input parts 110-1 or 110-2 may be provided.

[Voice Recognition Part 120]

The voice recognition part 120 receives input of voice data (voice data of user's speech) obtained by the input parts 110-1 and 110-2, performs voice recognition on the voice data (S12) and outputs texts of a plurality of recognition result candidates and information indicating priority which is order in the level of certainty of each text as the voice recognition result to the recognition result decision part 130.

[Speech Storage Part 140]

The speech storage part 140 is a storage part that stores speeches outputted in the past from the recognition result decision part 130 to the speech determination part 150 and speeches outputted in the past from the speech determination part 150 to the voice synthesis part 160. That is, the speech storage part 140 sequentially stores speeches outputted by the recognition result decision part 130 and speeches outputted by the speech determination part 150. Note that since the speeches stored in the speech storage part 140 are stored to be used by the recognition result decision part 130 and the speech determination part 150, past speeches which would be used neither by the recognition result decision part 130 nor by the speech determination part 150 may be deleted from the speech storage part 140.

[Recognition Result Decision Part 130]

The recognition result decision part 130 decides whether or not a recognition result of a desired level corresponding to the user's speech is obtained (S13), and when it is decided that a recognition result of a desired level is obtained, the recognition result decision part 130 outputs the text of the voice recognition result corresponding to the user's speech to the speech determination part 150 and the speech storage part 140, and when it is decided that a recognition result of a desired level is not obtained, the recognition result decision part 130 outputs information indicating that the voice recognition result corresponding to the user's speech is not the recognition result of the desired level to the speech determination part 150 and the speech storage part 140.

Figure 3:
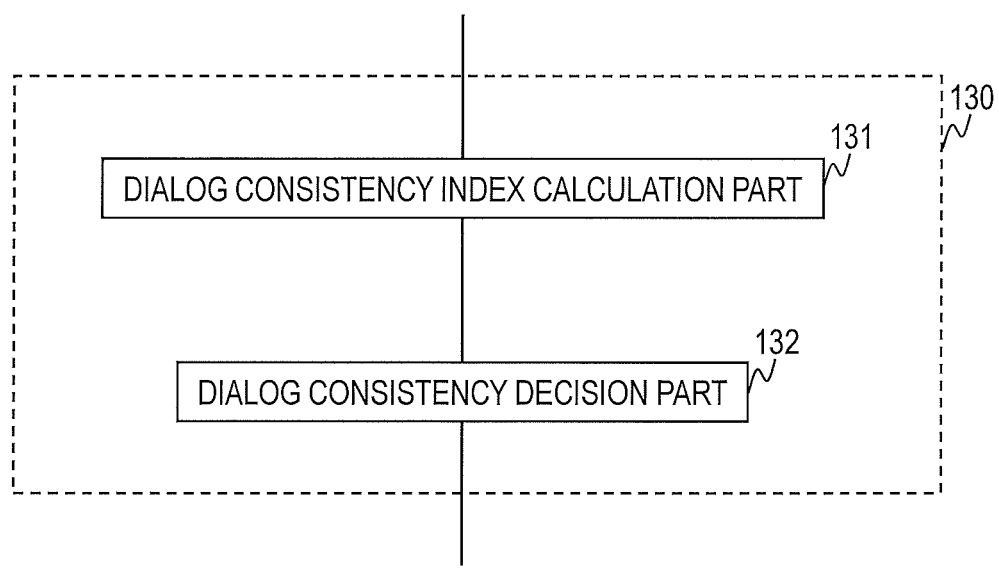
FIG. 3 is a functional block diagram of a recognition result decision part of the dialog system according to the first embodiment.

FIG. 3 is a functional block diagram of the recognition result decision part 130 of the present embodiment. The recognition result decision part 130 includes a dialog consistency index calculation part 131 and a dialog consistency decision part 132. Hereinafter, processing contents of each part will be described.

[Dialog Consistency Index Calculation Part 131]

The dialog consistency index calculation part 131 receives texts of a plurality of recognition result candidates for the user's speech outputted from the voice recognition part 120 as input. The dialog consistency index calculation part 131 acquires a text of a speech outputted from the dialog system 100 immediately before the user's speech, from the speech storage part 140 first. Here, the texts of the plurality of recognition result candidates inputted to the dialog consistency index calculation part 131 is referred to as "user speech candidate texts" and the text of the speech outputted from the dialog system 100 immediately before the user's speech acquired by the dialog consistency index calculation part 131 from the speech storage part 140 is referred to as a "text of the immediately preceding system speech." The dialog consistency index calculation part 131 next calculates an index indicating connectivity of topics between each of a plurality of user speech candidate texts and the text of the immediately preceding system speech or/and a degree of deviation of each of the plurality of user speech candidate texts from an estimated response to the text of the immediately preceding system speech, and outputs the index of connectivity and the degree of deviation to the dialog consistency decision part 132. As an index indicating the connectivity of topics, for example, the connectivity of topics between speeches described in reference literature 1 may be used, and as the degree of deviation from an estimated response, the technique described in reference literature 2 may be used. These can be calculated using Support Vector Machine or Deep Neural Network based on similarity between a word included in the user speech candidate text and a word included in the text of the immediately preceding system speech, appropriateness as a structure of a dialog behavior (question, self-disclosure, greeting or the like) abstracting each of the user speech candidate texts and the text of the immediately preceding system speech and similarity between each of the user speech candidate texts and the text of the immediately preceding system speech or the like.

(Reference Literature 1) Ryuichiro Higashinaka, Toyomi Meguro, Kenji Imamura, Hiroaki Sugiyama, Toshiro Makino, Yoshihiro Matsuo "Evaluating Coherence in Open Domain Conversational Systems", Proceedings of Interspeech 2014, pp. 130-134, September 2014.

(Reference Literature 2) Hiroaki Sugiyama, "Detecting failure in idle talk dialog using combination of data having different characteristics," Special Interest Group on Spoken Language Understanding and Dialog Processing, SIG-SLUD, 2015.

[Dialog Consistency Decision Part 132]

The dialog consistency decision part 132 receives the texts of the plurality of recognition result candidates for the user's speech outputted from the voice recognition part 120, information indicating priorities of the respective candidate texts, the index indicating connectivity of topics between the respective candidate texts calculated by the dialog consistency index calculation part 131 or/and the degree of deviation from an estimated response calculated by the dialog consistency index calculation part 131 as input. The dialog consistency decision part 132 sorts priorities of the plurality of recognition result candidates based on the index indicating connectivity of topics or/and the degree of deviation from an estimated response first. For example, the dialog consistency decision part 132 sorts the priorities of the plurality of recognition result candidates, for example, in such a way that priorities with indices representing higher connectivity of topics of the candidate texts are ranked higher or/and priorities with a greater degree of deviation from an estimated response are ranked lower. The dialog consistency decision part 132 then decides whether or not the candidate text of the recognition result with the highest priority after sorting is the recognition result of the desired level. When it is decided that the candidate text of the recognition result is the recognition result of the desired level, the dialog consistency decision part 132 outputs the candidate text to the speech determination part 150 and the speech storage part 140 as the text of the voice recognition result corresponding to the user's speech. When it is decided that the candidate text of the recognition result is not the recognition result of the desired level, the dialog consistency decision part 132 outputs information indicating that the voice recognition result corresponding to the user's speech is not the recognition result of the desired level to the speech determination part 150 and the speech storage part 140.

Whether or not the candidate text of the recognition result with the highest priority after sorting is the recognition result of the desired level is decided, for example, based on whether or not the index indicating connectivity of topics of the candidate text of the recognition result with the highest priority after sorting is equal to or higher than a predetermined threshold. That is, when the index indicating connectivity of topics of the candidate text of the recognition result with the highest priority after sorting is equal to or higher than a predetermined threshold, the dialog consistency decision part 132 outputs the candidate text to the speech determination part 150 and the speech storage part 140 as the text of the voice recognition result corresponding to the user's speech. When the index indicating connectivity of topics of the candidate text of the recognition result with the highest priority after sorting is less than the predetermined threshold, the dialog consistency decision part 132 outputs information indicating that the voice recognition result corresponding to the user's speech is not the recognition result of the desired level to the speech determination part 150 and the speech storage part 140. Note that the predetermined threshold is stored in advance in a storage part (not shown) of the recognition result decision part 130 as a threshold for a comparison with the index indicating connectivity of topics.

Furthermore, whether or not the candidate text of the recognition result with the highest priority after sorting is the recognition result of the desired level is decided, for example, based on whether or not the degree of deviation from an estimated response of the candidate text of the recognition result with the highest priority after sorting is equal to or less than a predetermined threshold. That is, when the degree of deviation from an estimated response of the candidate text of the recognition result with the highest priority after sorting is equal to or less than a predetermined threshold, the dialog consistency decision part 132 outputs the candidate text to the speech determination part 150 and the speech storage part 140 as the text of the voice recognition result corresponding to the user's speech. When the degree of deviation from an estimated response of the candidate text of the recognition result with the highest priority after sorting exceeds a predetermined threshold, the dialog consistency decision part 132 outputs information indicating that the voice recognition result corresponding to the user's speech is not the recognition result of the desired level to the speech determination part 150 and the speech storage part 140. Note that the predetermined threshold is stored in advance in the storage part (not shown) of the recognition result decision part 130 as a threshold for a comparison with the degree of deviation from an estimated response.

Note that whether or not the candidate text of the recognition result with the highest priority after sorting is the recognition result of the desired level may also be decided using both the index indicating connectivity of topics and the degree of deviation from an estimated response. More specifically, a degree of deviation d from an estimated response, a value of which is normalized from 0 to 1 is subtracted from an index c indicating connectivity of topics, a value of which is normalized from 0 to 1 as a difference (c−d). Using the difference (c−d) as an index, it is possible to select a candidate that achieves both a high connectivity of topics and a low degree of deviation from an estimated response to a certain degree. Moreover, d may be weighted using a weight w and the weighted d may be subtracted from the index c indicating the connectivity of topics, the value of which is normalized from 0 to 1 as (c−w*d). The degree of deviation d from the estimated response, the value of which is normalized from 0 to 1 is subtracted from 1 and the subtraction result is multiplied by the index c indicating connectivity of topics, the value of which is normalized from 0 to 1 as (c*(1−d)) or the subtraction result is weighted and multiplied by the index c as (c*w(1−d)). Using the product (c*(1−d)) or (c*w(1−d)) as an index makes it possible to realize such a combination that satisfies a predetermined standard only when the value of the index indicating connectivity of topics is large and the magnitude of degree of deviation is small and discards a case where the value of either one is smaller.

[Speech Determination Part 150]

When the speech determination part 150 receives the text of the voice recognition result corresponding to the user's speech from the recognition result decision part 130, that is, when the recognition result decision part 130 decides that the voice recognition result corresponding to the user's speech is the recognition result of the desired level, the speech determination part 150 determines the text of the speech presented by the dialog system 100 next to the user's speech based on at least the text of the voice recognition result corresponding to the user's speech (S21), and outputs the text to the voice synthesis part 160. Note that the robot that utters the speech may also be determined, and in this case, information indicating the robot that utters the speech is also outputted to the voice synthesis part 160. When the speech determination part 150 receives information indicating that the voice recognition result corresponding to the user's speech from the recognition result decision part 130 is not the recognition result of the desired level as input, that is, when it is decided that the voice recognition result corresponding to the user's speech is not the recognition result of the desired level, the speech determination part 150 performs the following processing. Using the <method for determining speech presented by dialog system when voice recognition result corresponding to user's speech is decided not to be recognition result of desired level> which will be described later, the speech determination part 150 determines the text of the speech presented by the dialog system 100 next to the user's speech, the text of the speech presented by the dialog system 100 that follows, each robot that utters each speech or the like and outputs the text of the speech presented by the dialog system 100, information indicating speech order, information indicating the robot that utters a speech or the like to the voice synthesis part 160.

Note that the speech determination part 150 is internally provided with a dialog system such as a dialog system called an "idle talk dialog system" described in reference literature 3 that generates and outputs a text of a speech according to a rule described in advance using a word included in the text of the inputted speech as a trigger. The dialog system incorporated in the speech determination part 150 generates and outputs a text of a speech based on at least the text of the voice recognition result corresponding to the user's speech.

(Reference Literature 3) Hiroaki Sugiyama, Toyomi Meguro, Ryuichiro Higashinaka, Yasuhiro Minami, "Generating response sentence using dependency and examples in response to user speech having arbitrary topic" Japanese Society for Artificial Intelligence, Collection of Papers of National Conference, vol. 30(1), pp. 183-194, 2015

Alternatively, the speech determination part 150 is internally provided with a dialog system as a dialog system called a "scenario dialog system" described in reference literature 4 that selects and outputs, when the text of the inputted speech corresponds to a choice of scenario stored in advance in the dialog system, a text of a speech stored in advance in correspondence with the choice. The dialog system provided in the speech determination part 150 selects and outputs a text of a speech based on at least the text of the voice recognition result corresponding to the user's speech from the text stored in advance in the dialog system.

(Reference Literature 4) Yasuhiro Arimoto, Yuichiro Yoshikawa, Hiroshi Ishiguro, "Impression Evaluation of Dialog without Voice Recognition by Plural Robots," Conference of the Robotics Society of Japan, 2016

[Voice Synthesis Part 160]

The voice synthesis part 160 performs voice synthesis on the text inputted from the speech determination part 150 (S41), obtains synthesized voice data and outputs the synthesized voice data obtained to the presentation part 170-1 of the robot R1 or the presentation part 170-2 of the robot R2. Upon receiving a plurality of texts and information indicating order of those speeches from the speech determination part 150 as input, the voice synthesis part 160 outputs synthesized voice data according to the order of speeches indicated by the information. When the voice synthesis part 160 receives a text and information indicating the robot that utters the text from the speech determination part 150 as input, the voice synthesis part 160 outputs the synthesized voice data to the presentation part of the robot corresponding to the information.

[Presentation Parts 170-1 and 170-2]

The presentation parts 170-1 and 170-2 reproduce voices corresponding to the synthesized voice data inputted from the voice synthesis part 160 (S42). This causes the user to listen to the speech of the robot R1 or R2 and a dialog between the user and the dialog system 100 is thereby realized.

Second Embodiment

A mode will be described in a second embodiment in which it is decided whether or not a voice recognition result on a user's speech is a recognition result of a desired level according to a value representing a likelihood of the voice recognition result.

A functional block diagram of the dialog system 100 according to the second embodiment is FIG. 1 which is identical to the functional block diagram of the dialog system 100 according to the first embodiment. A processing flow of the dialog system 100 according to the second embodiment is FIG. 2 which is identical to the processing flow of the dialog system 100 according to the first embodiment.

The dialog system 100 of the second embodiment differs from the dialog system 100 of the first embodiment in operations of the voice recognition part 120 and the recognition result decision part 130. Operations of other parts of the dialog system 100 of the second embodiment are the same as the operations of the respective parts with the same reference numerals as those of the dialog system 100 of the first embodiment. Hereinafter, operations of the voice recognition part 120 and the recognition result decision part 130 of the dialog system 100 according to the second embodiment will be described.

[Voice Recognition Part 120]

The voice recognition part 120 performs voice recognition on voice data obtained by the input parts 110-1 and 110-2, and outputs a text of one voice recognition result candidate and a voice recognition score which is a value representing the likelihood as the voice recognition result of the text.

[Recognition Result Decision Part 130]

Similarly to the recognition result decision part 130 of the first embodiment, the recognition result decision part 130 of the present embodiment also decides whether or not a recognition result of a desired level corresponding to the user's speech is obtained. Upon deciding that a recognition result of a desired level is obtained, the recognition result decision part 130 outputs a text of the voice recognition result corresponding to the user's speech to the speech determination part 150 and the speech storage part 140. Upon deciding that a recognition result of a desired level is not obtained, the recognition result decision part 130 outputs information indicating that the voice recognition result corresponding to the user's speech is not the recognition result of the desired level to the speech determination part 150 and the speech storage part 140.

Figure 4:
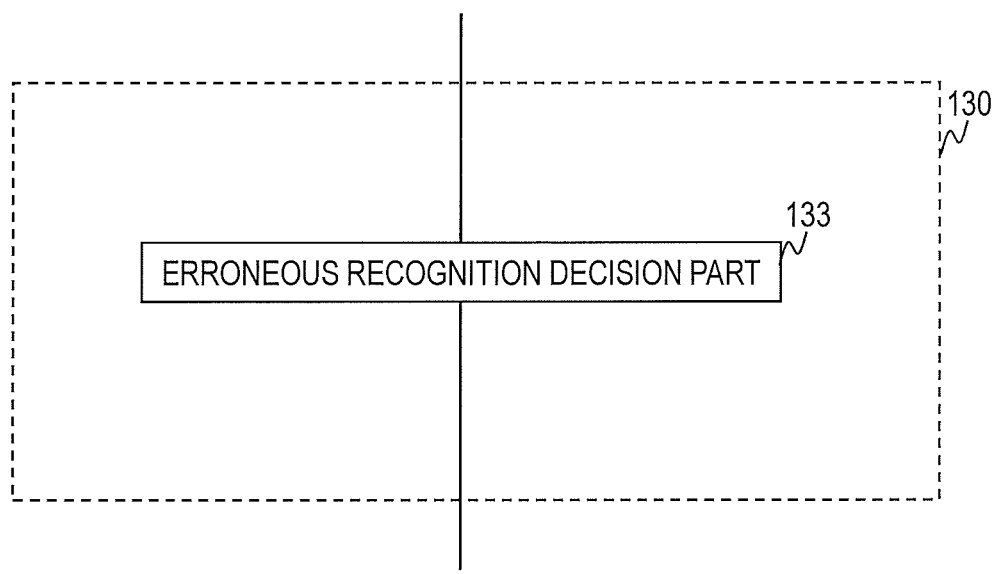
FIG. 4 is a functional block diagram of a recognition result decision part of the dialog system according to the second embodiment.

FIG. 4 is a functional block diagram of the recognition result decision part 130 of the present embodiment. The recognition result decision part 130 includes an erroneous recognition decision part 133.

[Erroneous Recognition Decision Part 133]

The erroneous recognition decision part 133 receives the text of the voice recognition result candidate corresponding to a user's speech outputted from the voice recognition part 120 and the voice recognition score which is a value representing likelihood as the voice recognition result of the text as input. The erroneous recognition decision part 133 decides whether or not the voice recognition score is equal to or higher than a threshold stored in advance in a storage part (not shown) in the erroneous recognition decision part 133, that is, whether or not the voice recognition result candidate corresponding to the user's speech is the recognition result of the desired level. When the voice recognition score is equal to or higher than the threshold, that is, when the voice recognition result candidate corresponding to the user's speech is the recognition result of the desired level, the erroneous recognition decision part 133 outputs a text of the voice recognition result candidate to the speech determination part 150 and the speech storage part 140 as the text of the voice recognition result corresponding to the user's speech. When the voice recognition score is less than the threshold, that is, when it is decided that the voice recognition result corresponding to the user's speech is not the recognition result of the desired level, the erroneous recognition decision part 133 outputs information indicating that the voice recognition result corresponding to the user's speech is not the recognition result of the desired level to the speech determination part 150 and the speech storage part 140.

<Method for Determining Speech Presented by Dialog System when Voice Recognition Result Corresponding to User's Speech is Decided not to be Recognition Result of Desired Level>

(1) Points

A point with the dialog system of the present invention is that when it is decided that the voice recognition result corresponding to the user's speech is not the recognition result of the desired level, the robot responds to the user's speech with an ambiguous reply or nodding such as "I see" or "Hmm" and then the robot utters a speech associated with the context of the dialog up to a speech immediately before the user's speech. Thus, the dialog system forcibly changes the topic of the dialog, and can continue the dialog with the user without using the voice recognition result corresponding to the user's speech while behaving as if it recognizes the user's speech. Therefore, according to the present invention, even when voice recognition cannot be performed successfully, the user can continue the dialog with the same topic so far while feeling that the own speech has been recognized. As a result, the user need not think of the next speech and can easily continue the dialog itself without repeating the speech, thus providing an effect that the user's willingness to perform a dialog is not depressed.

Note that by making the speech uttered by the robot after responding to the user speech with an ambiguous reply or nodding have somehow limited content, it is more likely to prevent overlapping with the contents of the user's speech on which voice recognition by the dialog system has failed. This is intended to prevent the robot from giving the user an impression that the robot does not understand the user's speech by uttering a speech overlapping with the contents of the user's speech, that is, uttering a speech having the same meaning as that of the user's speech or a speech that directly questions the contents of the user's speech.

(2) Dialog Examples

Next, dialog examples between the user and the robot in the dialog system of the present invention will be shown below where it is decided that the voice recognition result corresponding to the user's speech is not the recognition result of the desired level. Suppose in the following dialog examples, speeches are uttered in order of a speech t(1), a speech t(2), . . . , a speech t(6). Here, "robot R1→user" means that the robot R1 utters a speech with an intention to talk to the user and "user→robot R1" means that the user utters a speech with an intention to talk to the robot R1. Note that to whom the robot intends to talk may be expressed by motion of the head or a sight line of the robot or may not be expressed at all.

(Dialog Example 1)

| | | |
|---|---|---|
| Speech t(1): | Robot R1→user: | "What kind of food do you like?" |
| Speech t(2): | User→robot R1: | "Ran skies" (erroneous recognition for "I like ramen!") |

| | | |
|---|---|---|
| Speech t(3): | Robot R1→user: | "Hmm" (nodding) |
| Speech t(4): | Robot R2→robot R1: | "I like grilled meat at the restaurant **!" |
| Speech t(5): | Robot R1→robot R2: | "Grilled meat is also good" |
| Speech t(6): | Robot R2→robot R1: | "Let's eat out somewhere next time" |

(Dialog Example 2)

| | | |
|---|---|---|
| Speech t(1): | Robot R1→user: | "What kind of food do you like?" |
| Speech t(2): | User →robot R1: | "Beppu" (erroneous recognition for "Nothing in particular") |
| Speech t(3): | Robot R1→user: | "Oh, I see" (nodding) |
| Speech t(4): | Robot R2→user: | "Do you like ramen at the restaurant **?" (which makes speech have somehow limited content) |
| Speech t(5): | Robot R1→robot R2: | "What I like about ramen at the restaurant ** is its heaviness" |
| Speech t(6): | Robot R1→user: | "Don't you think so?" |

(3) Operation that Determines Text

Hereinafter, operation for the speech determination part 150 to determine a text of a speech presented by the dialog system will be described with reference to the above dialog examples when it is decided that the voice recognition result corresponding to the user's speech is not the recognition result of the desired level.

When it is decided that the voice recognition result corresponding to the user's speech t(2) is not the recognition result of the desired level, that is, when the recognition result of the desired level of the user's speech t(2) is not obtained, the speech determination part 150 generates a text of a speech which does not include any content words or selects a text from among a plurality of speech text candidates stored in advance in the speech determination part 150 as a text of the speech t(3) presented by the dialog system 100 immediately after the user's speech t(2) and outputs the text to the voice synthesis part 160 (S31). Note that the content word refers to a word that expresses substantial contents such as noun, adjective, verb and adverb. A speech that does not include any content words is a speech that does not break a dialogue flow, for example, a speech like nodding or more specifically, "Hmm" in the aforementioned dialog example 1 and "Oh, I see" in dialog example 2.

When it is decided that the voice recognition result corresponding to the user's speech t(2) is not the recognition result of the desired level, that is, when the recognition result of the desired level of the user's speech t(2) is not obtained, the speech determination part 150 generates a text of a speech not based on the user's speech t(2) or selects a text from among the plurality of speech text candidates stored in advance in the speech determination part 150 as a text of a speech t(4) presented by the dialog system 100 after the dialog system 100 presents the speech t(3) and outputs the text to the voice synthesis part 160. That is, the speech t(4) presented by the dialog system 100 is a speech generated or selected not based on the user's speech t(2) (S32).

A first example of the speech t(4) generated or selected not based on the user's speech t(2) is a speech generated in association with at least part of at least one of the speech uttered by the user before the speech t(2) and the speech presented by the dialog system before the speech t(2). For example, in dialog example 1, the speech t(4) of the robot R2 "I like grilled meat at the restaurant !" is a speech not based on the speech t(2) "Ran skies" which is an erroneous recognition result of "I like ramen!" which is the user's speech, and associated with the speech t(1) "What kind of food do you like?" uttered earlier by the robot R1. In this example, the text of the speech t(4) is generated by the speech determination part 150 based on at least part of at least one of the text of the voice recognition result of the past user's speech stored in the speech storage part 140 and the text of the speech determined in the past by the speech determination part 150 stored in the speech storage part 140. More specifically, the text of the speech t(4) is generated by a dialog system called an "idle talk dialog system" provided in the speech determination part 150**.

A second example of the speech t(4) generated or selected not based on the user's speech t(2) is a speech selected in association with at least part of at least one of the speech uttered by the user before the speech t(2) and the speech presented by the dialog system before the speech t(2). In this example, the text of the speech t(4) is selected by the speech determination part 150 from texts of speeches stored in advance in the storage part (not shown) provided in the speech determination part 150 based on at least part of at least one of the text of the voice recognition result of the past user's speech stored in the speech storage part 140 and the text of the speech determined in the past by the speech determination part 150 stored in the speech storage part 140. More specifically, by a dialog system called a "scenario dialog system" provided in the speech determination part 150, a topic of the dialog is determined based on at least part of at least one of the text of the voice recognition result of the past user's speech stored in the speech storage part 140 and the text of the speech determined in the past by the speech determination part 150 stored in the speech storage part 140. The scenario dialog system selects the text of the speech t(4) from texts of speeches stored in advance as speech texts of a scenario corresponding to the determined topic. Note that in the scenario dialog system, the speech determined in the past by the speech determination part 150, stored in the speech storage part 140 is a text of the speech in the scenario of the topic of the current dialog stored in advance in the storage part (not shown) provided in the speech determination part 150. Therefore, the speech determination part 150 may select a text of the speech t(4) from texts of speeches in the scenario of the current topic stored in advance in the storage part (not shown) provided in the speech determination part 150 according to the topic of the current dialog.

The speech t(4) presented by the dialog system in the first example and the second example is a speech generated or selected in association with at least part of at least one of the speech uttered by the user before the speech t(2) and the speech presented by the dialog system before the speech t(2). Therefore, the speech t(4) is a speech based on the topic of the speech before the speech t(2). That is, although the speech t(4) is a speech not directly responding to the contents of the speech t(2) which is an immediately preceding user's speech, it is a speech having something to do with the speech t(2). For this reason, according to the first example and the second example, it is possible to cause the user to recognize that the speech t(4) is a speech related to the own speech t(2) and reduce a sense of discomfort felt by the user toward the speech t(4).

A third example of the speech t(4) generated or selected not based on the user's speech t(2) is a speech neither related to the speech uttered by the user before the speech t(2) nor related to the speech presented by the dialog system before the speech t(2). In this example, for the text of the speech t(4), a speech neither related to the past user's speech stored in the speech storage part 140 nor related to the speech determined in the past by the speech determination part 150 stored in the speech storage part 140 is selected by the speech determination part 150 from the texts of the speeches stored in the storage part (not shown) provided in the speech determination part 150. More specifically, using the dialog system called a "scenario dialog system" provided, for example, in the speech determination part 150, a topic of the dialog is obtained, in other words, a topic different from the topic of the dialog between the user and the dialog system before the user's speech t(2) is obtained based on neither the text of the voice recognition result of the past user's speech stored in the speech storage part 140 nor the text of the speech determined in the past by the speech determination part 150 stored in the speech storage part 140, and the text of the speech t(4) is selected from the text of the speech stored in advance as the text for the speech of the scenario corresponding to the topic obtained.

According to the third example, although the speech t(4) is a speech not related to speeches before the speech t(2), since the user feels that the dialog system has responded to the preceding speech t(3) or the user's speech t(2), it is possible to lessen the user's sense of discomfort even when the topic is changed by the speech t(4).

(4) Operation of Determining Robot that Performs Speech

As described in the first embodiment, the speech determination part 150 may also determine a robot that performs a speech. Hereinafter, operation for the speech determination part 150 to determine a robot that utters a text of a speech presented by the dialog system will be described with reference to the above dialog examples when it is decided that the voice recognition result corresponding to the user's speech is not the recognition result of a desired level.

The speech determination part 150 decides the robot that utters a speech which becomes a trigger of the user's speech t(2) as the robot that utters the speech t(3) which does not include any content words presented by the dialog system 100 immediately after the user's speech t(2) and outputs information expressing the robot that utters the speech t(3) to the voice synthesis part 160. The "speech which becomes a trigger of the user's speech t(2)" is, for example, the speech t(1) that asks the user a question, and is the speech of the robot R1 in the above dialog examples. That is, the speech determination part 150 determines the robot R1 that utters the speech t(1) that asks the user a question as the robot that utters the speech t(3) and outputs information expressing the robot R1 to the voice synthesis part 160 as the information expressing the robot that utters the speech t(3).

The robot R1 that utters the speech t(1) asking the user a question utters the speech t(3) such as nodding, and the user can thereby feel that the own speech is recognized by the robot R1 that has asked the user a question.

The speech determination part 150 determines a robot which is different from the robot that utters the speech t(3) as the robot that utters the speech t(4) generated or selected not based on the user's speech t(2) and outputs information expressing the robot that utters the speech t(4) to the voice synthesis part 160. Since the robot that utters the speech t(3) in the above dialog examples is the robot R1, the speech determination part 150 determines the robot R2 which is different from the robot R1 as the robot that utters the speech t(4). The speech determination part 150 outputs information expressing the robot R2 to the voice synthesis part 160 as information expressing the robot that utters the speech t(4).

By making the robot that utters the speech t(4) different from the robot that utters the speech t(3), even when contents of the speech t(4) of the robot R2 do not directly respond to contents of the user's speech t(2), it is possible to reduce the sense of discomfort felt by the user toward the speech t(4).

<First Modification>

A mode has been described in the first embodiment where the recognition result decision part 130 decides whether or not a recognition result of a desired level corresponding to the user's speech is obtained using an index indicating connectivity of topics between the text of the user speech and the text of the immediately preceding system speech or/and the degree of deviation from an estimated response from the text of the immediately preceding system speech of the user's speech text. An example has been described in the second embodiment where the recognition result decision part 130 decides whether or not the recognition result of the desired level corresponding to the user's speech is obtained using a voice recognition score. However, it is also possible to decide whether or not the recognition result of the desired level corresponding to the user's speech is obtained using a decision method which is different from both the first embodiment and the second embodiment.

<Second Modification>

A dialog system including two robots has been described in the first embodiment and the second embodiment. However, as described above, there is also a mode in which the speech determination part 150 does not determine any robot that utters a speech. Therefore, there is a mode in which the dialog system 100 does not always require two robots. When such a mode is adopted, the number of robots included in the dialog system 100 may be one. Furthermore, as described above, there is a mode in which the speech determination part 150 determines two robots as robots that utter speeches. This mode may be operated in a configuration in which the dialog system 100 includes three or more robots.

<Third Modification>

In a configuration in which the dialog system 100 includes a plurality of robots, if the user is enabled to determine which robot utters a speech, the number of presentation parts need not coincide with the number of robots. Furthermore, the presentation part need not be mounted on the robot. As a method of enabling the user to determine which robot utters a speech, well-known techniques may be used such as differentiating voice qualities to be synthesized from one robot to another, differentiating normal positions from one robot to another using a plurality of speakers.

<Fourth Modification>

An example has been described in the aforementioned embodiments where dialogs with voices are performed using robots as agents. However, the robots in the aforementioned embodiments may be humanoid robots having physical bodies or the like or robots without physical bodies or the like. The dialog technique of the invention is not limited to the above-described techniques, but may be a mode in which a dialog is performed using agents without any entity like a physical body such as a robot, not provided with any utterance mechanism. One such mode may be a mode in which a dialog is performed using an agent displayed on a screen of a computer. More specifically, in group chats in which a plurality of accounts perform dialogs using text messages such as "LINE" and "2-channel (registered trademark)", the present dialog system is applicable to a mode in which a dialog is performed between the user's account and an account of a dialog apparatus. In this mode, the computer having a screen for displaying agents needs to be located in the vicinity of a human, but the computer and the dialog apparatus may be connected together via a network such as the Internet. That is, the present dialog system is applicable not only to a dialog in which speakers such as a human and a robot actually speak face to face, but also to a dialogue in which speakers communicate with each other through a network.

Figure 5:
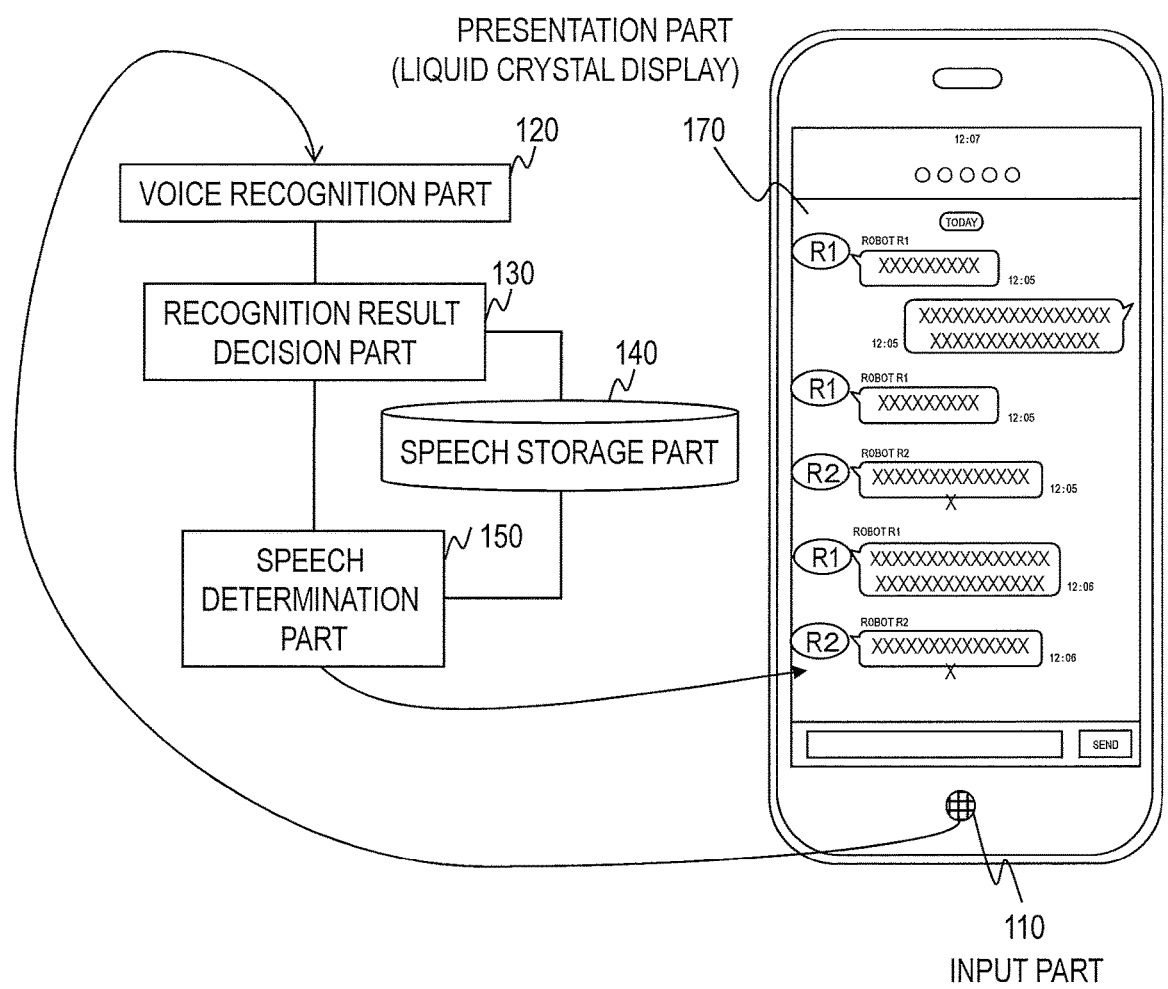
FIG. 5 is a diagram illustrating a dialog system according to a third modification.

As shown in FIG. 5, a dialog apparatus according to a modification is provided with an input part 110, a voice recognition part 120, a recognition result decision part 130, a speech storage part 140, a speech determination part 150 and a presentation part 170. The voice recognition part 120, the recognition result decision part 130, the speech storage part 140 and the speech determination part 150 may be provided with an interface that can communicate with an information processing apparatus existing outside and a processing part including part of or a similar function of each part may be configured in the information processing apparatus outside the dialog apparatus.

Examples of the dialog apparatus according to the modification include a mobile terminal such as a smartphone and a tablet or an information processing apparatus such as a desktop or lap top personal computer. The following description is given assuming that the dialog apparatus is a smartphone. The input part 110 is a microphone provided for the smartphone, the presentation part 170 is a liquid crystal display provided for the smartphone. A window of chat application is displayed on this liquid crystal display and dialog contents of the group chat are displayed in the window in time-series order. The "group chat" is a function whereby a plurality of accounts in a chat mutually contribute text messages and develop a dialog. Suppose a plurality of virtual accounts corresponding to virtual characters controlled by the dialog apparatus and the user's account participate in this group chat. That is, the present modification is an example of a case where the agent is a virtual account displayed on the liquid crystal display of the smartphone which is the dialog apparatus. The user enters speech contents into the input part 110 and can contribute the speech contents to the group chat through the own account. The speech determination part 150 contributes the determined speech contents to the group chat through each virtual account. Note that a configuration may also be adopted in which the user inputs speech contents to the input part 110 in handwriting using the touch panel and the character recognition function mounted on the smartphone. A configuration may also be adopted in which the dialog system 100 outputs speech contents obtained from each dialog system with voices from the speaker corresponding to each virtual account using the speaker and the voice recognition function mounted on the smartphone.

Note that when speeches of the agents are displayed on the presentation part 170 (display) simultaneously, the user may feel a sense of discomfort, and so the speeches are preferably displayed one by one. Furthermore, the recognition result of the user's speech may also be displayed on the presentation part 170 (display). In the case where a voice recognition result of a desired level corresponding to the speech uttered by the user is not obtained or where a character recognition result of a desired level corresponding to a speech the user entered in handwriting is not obtained, that is, when a recognition result of a desired level corresponding to the user's speech is not obtained, the speech may be erroneous recognition. To avoid the user from feeling this erroneous recognition, it is preferable not to display any recognition result candidates when the recognition result of the desired level is not obtained on the presentation part 170 (display). However, despite the fact that the recognition result of a desired level corresponding to the user's speech is not obtained, the user's speech may be displayed on the presentation part 170 (display). In that case, it may be possible to display the recognition result corresponding to the user's speech when the recognition result of the desired level is obtained or one of recognition result candidates corresponding to the user's speech when the recognition result of the desired level is not obtained as the user's speech on the presentation part 170 (display).

<Other Modifications>

The present invention is not limited to the above-described embodiments and modifications, but the various processes described above other than the speech order presented by the presentation part may not only be executed in time-series order according to the description, but also be executed in parallel or individually according to a processing capability of the apparatus that executes the processes or as required. In addition, the various processes may be changed as appropriate without departing from the spirit and scope of the present invention.

<Program and Recording Medium>

The various processing functions of the respective apparatuses described in the above-described embodiments and the first to third modifications may be implemented by a computer. In such a case, processing contents of the functions that should be possessed by the respective apparatuses are described by a program. Furthermore, the various processing functions of the dialog system described in the above fourth modification may be implemented by a computer. In such a case, processing contents of the functions that should be possessed by the dialog system are described by a program. The various processing functions of the respective apparatuses are implemented on the computer by executing this program by the computer.

The program that describes the processing contents can be recorded in a computer-readable recording medium. Examples of the computer-readable recording medium include a magnetic recording apparatus, an optical disk, a magneto-optical recording medium, a semiconductor memory or any medium.

This program is circulated through sales, transfer or rent of a portable recording medium such as DVD, CD-ROM that records the program. The program may also be circulated by storing the program in a storage apparatus of a server computer, and transferring the program from the server computer to another computer through a network.

The computer that executes such a program stores a program recorded in a portable storage medium or a program transferred from the server computer in the own storage part. At the time of execution of the process, this computer reads the program stored in the own storage part and executes the process according to the read program. As another embodiment of the program, the computer may read the program directly from a portable recording medium and may execute the process according to the program. Furthermore, every time the program is transferred to the computer from the server computer, the process may be executed successively according to the received program. The above-described process may be executed by a so-called ASP (Application Service Provider) type service in which without the server computer transferring the program to the computer, the processing function is implemented only by instructing execution thereof and acquiring the result. Note that the program in this mode includes a semi-program which is information used for processing by a computer (data which is not a direct instruction on the computer but has a characteristic of defining processing of the computer).

Although the respective apparatuses are configured by executing a predetermined program on the computer, at least some of these processing contents may be implemented by hardware.

What is claimed is:

1. A dialog method carried out by a dialog system comprising an agent that performs a dialog with a user, the dialog method comprising:
   a speech receiving step in which the dialog system receives input of a user speech which is a speech of the user;
   a first presentation step in which where the dialog system cannot obtain any recognition result of a desired level corresponding to the user speech, the dialog system presents a speech which does not include any content words as a first agent speech which is a speech of the agent uttered immediately after the user speech; and
   a second presentation step in which the dialog system presents a speech generated or selected not based on the user speech as a second agent speech, which is a speech of an agent which is different from the agent uttered after uttering the first agent speech, wherein the second agent speech is a speech associated with at least part of at least one of a speech uttered by the user before the user speech to which the dialog system cannot obtain any recognition result of the desired level corresponding and a speech uttered by the agent before the user speech to which the dialog system cannot obtain any recognition result of the desired level corresponding.

2. The dialog method according to claim 1, wherein the second agent speech is a speech generated or selected based on at least part of at least one of a speech uttered by the user before the user speech and a speech uttered by the agent before the user speech.

3. The dialog method according to claim 1, wherein the second agent speech is a speech based on a topic of a dialog between the user and the agent before the user speech.

4. The dialog method according to claim 1, wherein the second agent speech is a speech with a topic different from a topic of a dialog between the user and the agent before the user speech.

5. The dialog method according to claim 2, wherein the second agent speech is a speech based on a topic of a dialog between the user and the agent before the user speech.

6. The dialog method according to any one of claims 1 to 5 further comprising a recognition result decision step in which the dialog system decides that a recognition result of a desired level corresponding to the user speech is not obtained when an index indicating connectivity of topics between a text of a voice recognition result corresponding to the user speech and a text of a speech uttered by the dialog system before the user speech is less than a predetermined threshold or/and when a degree of deviation of the text of the voice recognition result corresponding to the user speech from an estimated response to the text of the speech uttered by the dialog system before the user speech exceeds a predetermined threshold.

7. A computer-readable non-transitory recording medium that records a program for causing a computer to execute each step of the dialog method according to any one of claims 1 to 5.

8. A dialog apparatus that obtains a speech uttered by an agent that performs a dialog with a user, the dialog apparatus comprising:
   a recognition part that recognizes a user speech which is a speech of the user and obtains a recognition result;
   a recognition result decision part that decides whether or not the recognition result of the user speech is a recognition result of a desired level; and
   a speech determination part that obtains, where the recognition result of the desired level corresponding to the user speech is not obtained, a speech which does not include any content words as a first agent speech which is a speech of the agent uttered immediately after the user speech, and generates or selects a speech not based on the user speech as a second agent speech, which is a speech of an agent which is different from the agent uttered after uttering the first agent speech, wherein the speech determination part generates or selects a speech associated with at least part of at least one of a speech uttered by the user before the user speech to which the dialog apparatus cannot obtain any recognition result of the desired level corresponding and a speech uttered by the agent before the user speech to which the dialog apparatus cannot obtain any recognition result of the desired level corresponding, as the second agent speech.

9. The dialog apparatus according to claim 8, wherein the speech determination part generates or selects a speech with a topic different from a topic of a dialog between the user and the agent before the user speech as the second agent speech.

10. A computer-readable non-transitory recording medium that records a program for causing a computer to function as the dialog apparatus according to any one of claims 8 and 9.

* * * * *